(12) United States Patent
Braun et al.

(10) Patent No.: US 6,462,442 B1
(45) Date of Patent: Oct. 8, 2002

(54) ENCODER WITH A HOUSING, WHICH CAN BE ASSEMBLED

(75) Inventors: Paul-Wilhelm Braun, Troisdorf; Jens Hannemann, Eisenach, both of (DE)

(73) Assignee: PWB-Ruhlatec Industrieprodkte GmbH, Seebach (DE)

( * ) Notice: Subject to any disclaimer, the term of this patent is extended or adjusted under 35 U.S.C. 154(b) by 0 days.

(21) Appl. No.: 09/579,299

(22) Filed: May 25, 2000

(30) Foreign Application Priority Data

May 25, 1999 (DE) .......................................... 199 23 900

(51) Int. Cl.[7] .......................... G01D 5/26; G01D 21/22; H02K 11/00
(52) U.S. Cl. .......................... 310/68 B; 310/42; 310/89; 250/231.13
(58) Field of Search .................................. 310/42, 68 B, 310/67 R, 89; 29/592.1; 250/231.13, 231.14, 231.15, 231.16, 231.17, 231.18, 239

(56) References Cited

U.S. PATENT DOCUMENTS

| | | | | |
|---|---|---|---|---|
| 4,942,295 A | * | 7/1990 | Brunner et al. | 250/213.13 |
| 5,057,684 A | | 10/1991 | Service | 250/231.13 |
| 5,081,756 A | * | 1/1992 | Abe et al. | 29/593 |
| 5,184,038 A | * | 2/1993 | Matsui et al. | 310/42 |
| 5,708,496 A | | 1/1998 | Barnett et al. | 356/28 |
| 5,859,425 A | * | 1/1999 | Mleinek et al. | 250/231.13 |
| 5,883,384 A | * | 3/1999 | Kato et al. | 250/213.13 |

FOREIGN PATENT DOCUMENTS

| | | |
|---|---|---|
| DE | 196 41 929 A1 | 4/1998 |
| EP | 0 557 564 A1 | 9/1993 |

* cited by examiner

*Primary Examiner*—Burton S. Mullins
(74) *Attorney, Agent, or Firm*—Darby & Darby

(57) ABSTRACT

In the case of an encoder with a housing, which can be assembled, for flanging at the front end to a motor, which has a motor shaft protruding into the housing at at least one flange plane, the housing consists of a base plate with an inner part and an upper part of the housing, which can be fitted into one another for the assembly. On the inner part of the housing, bayonet segments are disposed, which engage corresponding recesses of the upper part of the housing and at which guiding surfaces are constructed, which form a sliding guide with corresponding counter surfaces at the upper part of the housing. In a roof surface of the upper part of the housing, a contact surface for adjusting a timing disk on the motor shaft is formed concentrically with the latter, which has a guiding shaft for the motor shaft with a borehole. A fork, which can be shifted transversely to the axis of the timing disk and has prong openings of two different widths, is fixed in its starting position, before the assembly, in the guiding shaft in a position centered with respect to the motor shaft. After the insertion of the motor shaft in the guiding shaft and the shifting of the fork, the timing disk is released.

3 Claims, 3 Drawing Sheets

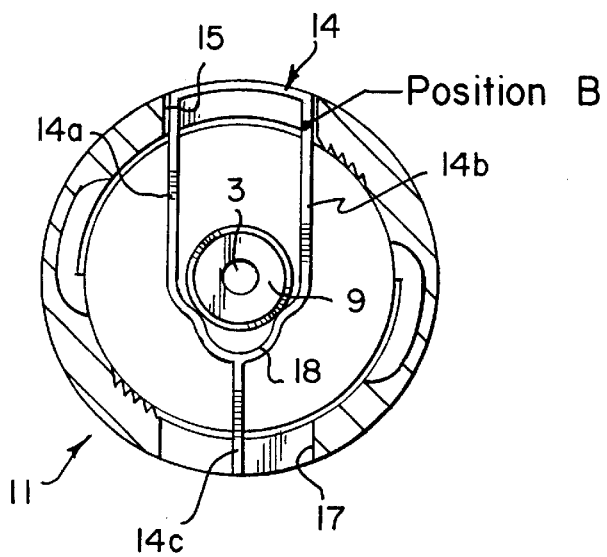
FIG. 2B
FIG. 3
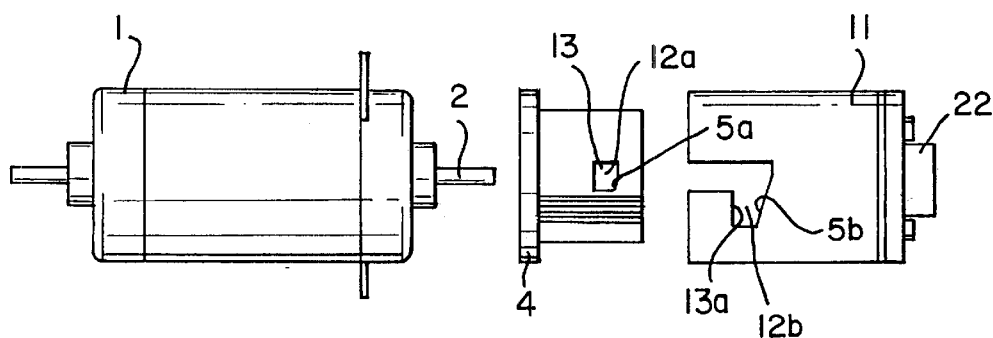
FIG. 4
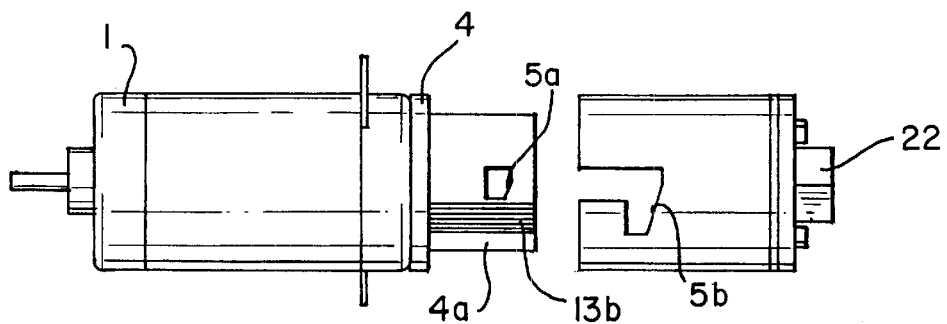

… ≈ …

ENCODER WITH A HOUSING, WHICH CAN BE ASSEMBLED

BACKGROUND OF THE INVENTION

1. Field of the Invention

The invention relates to an encoder with a housing, which can be assembled, for flanging at the front end to a motor 1, which has a motor shaft 2 protruding into the housing at at least one flange plane, the housing consisting of a base plate 4 with an inner part 4a and an upper part 11 of the housing, which can be fitted into one another for the assembly. On the inner part 4a of the housing, bayonet segments 12a are disposed, which engage corresponding recesses 12b of the upper part of the housing. Furthermore, at the bayonet segment 12a, guiding surfaces 5a are constructed, which form a sliding guide with corresponding counter surfaces 5b at the upper part of the housing and which, when inserted, bring about a separation of the upper part 11 from the base plate 4 by rotation in the peripheral direction. In a roof surface of the upper part of the housing, a contact surface 16 for adjusting a timing disk 10 on the motor shaft 2 is formed concentrically with the latter.

2. Description of the Related Art

An encoder of the type mentioned above is known from the DE 196 41 926 A1 (RUHLATEC Industrieprodukte GmbH). The timing disk holder, described there, is held by a retaining ring 14 in the pre-assembled state in the housing unit and, by these means, prevented from inadvertently falling out of the housing. The retaining ring 14 has adequate clearance for centering the timing disk on the motor shaft while the upper and lower parts of the housing are being assembled.

In the case of shafts of larger diameter (more than 3 mm), the assembly becomes very difficult because of the pressing-on forces, which constantly become larger. The surface quality of the motor shaft and the timing disk hub must be very high, so that jamming cannot occur even when the fit tolerances are very tight. A further problem consists therein that, after the assembly is completed, there must be a so-called "unlocking" of the timing disk. This means that the housing is distanced from the timing disk only by rotating the bayonet surfaces; the timing disk then runs freely on bearings on the motor shaft. Here also, there can be problems with the retaining ring.

SUMMARY OF THE INVENTION

It is therefore an object of the present invention to make it possible, in the case of an encoder of the type named above, to secure the timing disk before the assembly and the unlocking after the assembly in such a manner that, on the one hand, a central position in relation to the motor shaft is maintained even under more difficult installation and transporting conditions and, on the other, a reliable unlocking can take place after the upper part of the housing is fitted together with the base plate, which is connected with the motor shaft.

Pursuant to the invention, this objective is accomplished by the distinguishing features given in the claims. It has turned out that a reliable centering and unlocking becomes possible when a fork with prong openings of different width is used.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

In the following, the invention is described in greater detail by means of several examples and a drawing, in which FIGS. 2A and 2B show a longitudinal and a cross section of an inventive encoder after the assembly, FIGS. 3 to 6 show the course of the assembly when the upper part of the housing is fitted together with the lower part, which is fastened to the motor.

DETAILED DESCRIPTION OF THE PRESENTLY PREFERRED EMBODIMENTS

Figure 1A:
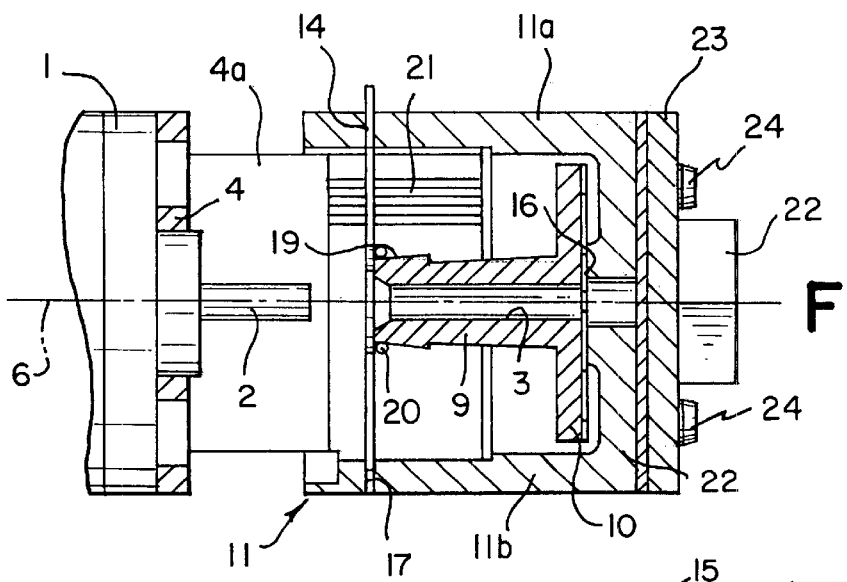
FIGS. 1A and 1B show a longitudinal and a cross section of an inventive encoder before the assembly.
Figure 1B:
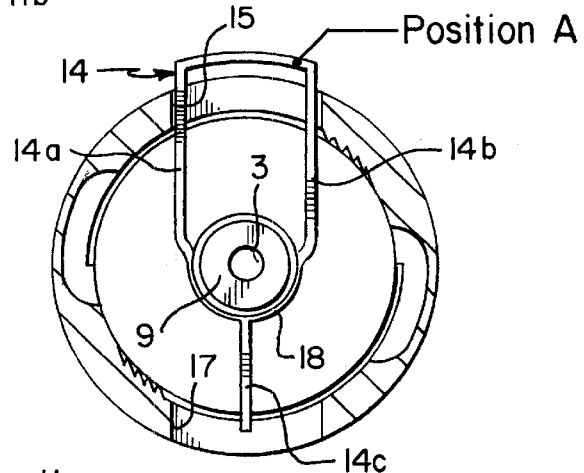

In FIGS. 1A and 1B, the motor is represented as 1, the motor shaft as 2, the base plate as 4 and the interior part of the housing as 4a. An upper part 11 of the housing is to be pushed over the interior part 4a of the housing and firmly connected with the base plate. The upper part of the housing, shown in the pre-assembled state, consists of a pipe section 11a and a bottom section 11b, which has a contacting surface 16 for a timing disk 10 on the inside. The axis 6 of the timing disk is identical with the cylinder axis of the housing 11 when the timing disk 10 is in the centered state.

The centered state is attained due to the fact that, at the timing disk 10, a guiding shaft 9 is constructed, the free end of which is held by a fork 14. The fork ends 14a, 14b and 14c are guided in corresponding guides 15, 17 of the upper part 11 of the housing. By these guides, slippage of the timing disk 10 in the pre-assembled state is almost precluded.

To improve the centering effect and the fixing effect, an outer cone 19, which tapers toward the flange plane of the motor 1, can be formed at one end of the guiding shaft 9. At the narrowest place, a ring 20 is disposed on the conical surface and offers an additional stop surface for the fork 14.

Furthermore, in the longitudinal cross section of FIG. 1A, a raster surface 21 can be seen, which can be engaged by appropriately constructed counter-rasters (not shown) at the inner housing 4a. Furthermore, a pin and socket connector 22 for the electrical connection of the encoder and a cover plate 23 of the upper part 11 of the housing with bolted connections 24 can be seen.

Figure 2A:
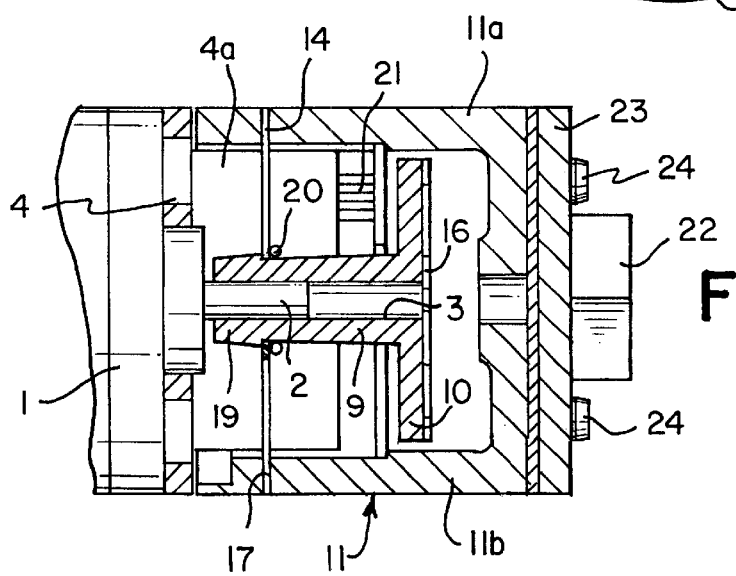

In FIG. 2A, the inventive encoder is shown after it is assembled. In the longitudinal section, the timing disk 10 can be seen after it is disconnected. It is "taper-bore" mounted only on the motor shaft and can thus be rotated freely movable in the upper part 11 of the housing. When impressed in the direction of the arrow, the fork 14 terminates flush with the upper surface of the housing, as a result of which the danger of contaminating or damaging the fork 14 is avoided.

After the motor shaft 2 is impressed into the borehole 3 of FIG. 2B of the guiding shaft 9, the ring 20 has slipped on the outer cone 19 towards the outside in the direction of the timing disk 10. An elastic synthetic resin, rubber or the like is preferably selected as the material of construction for the ring 20.

It can be seen from the cross-sectional representation of FIG. 2 that the fork 14, after being impressed into the housing guide 15, 17, completely releases the guiding shaft 9. For this purpose, the clamp 18, which embraces the guiding shaft in semicircular fashion in FIG. 1B, is brought into a position remote from the drilled surface of the guiding shaft 9, so that there is adequate clearance for the timing disk 10 to run freely on bearings.

Figure 5:
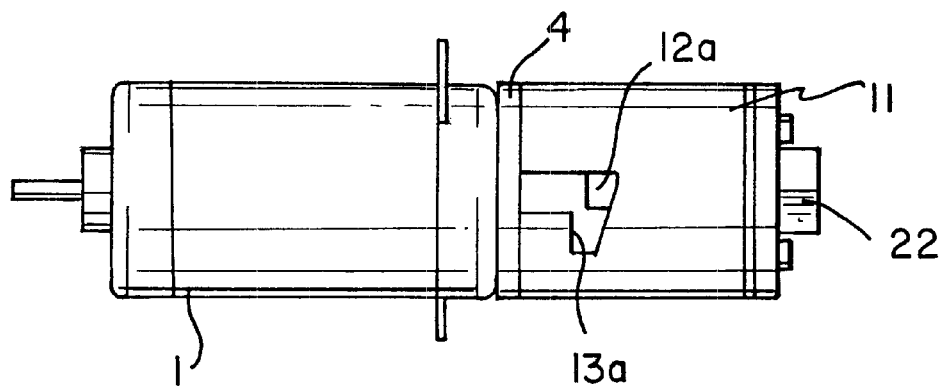
Figure 6:
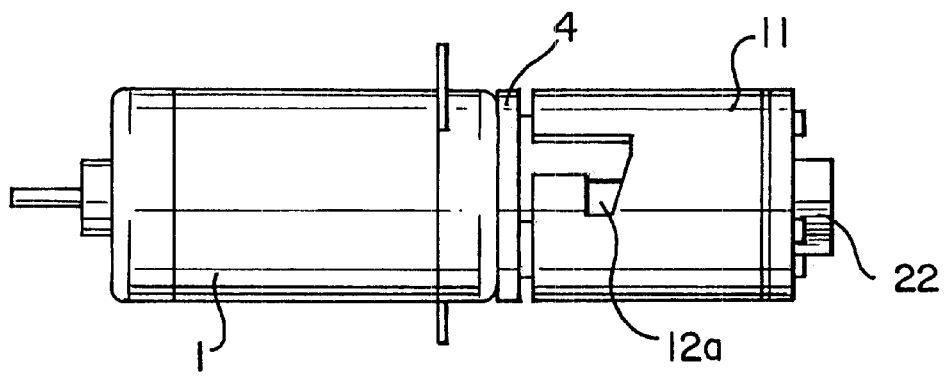

In the series of figures starting with 3, the assembly of the insertable encoder is shown in detail. For this purpose, to begin with, the motor 1 with the motor shaft 2 is connected with the lower part 4*a* of the housing, the flange plate or base plate 4 being firmly bolted in the usual manner to the motor. On the inside of the housing, an embossing 13*b* can be seen, which is brought into contact with the embossing at the upper part 11 of the housing described above. This is accomplished by sliding on the upper part of the housing and subsequently twisting in the direction of the arrow of FIG. 5. During the twisting, the guiding surface 5*a* of the bayonet segment 12*a* slides on the counter surface 5*b* of the recess 12*b*, as a result of which the upper part 11 of the housing is shifted in the direction of the arrow of FIG. 6. With that, unlocking of the timing disk 10 is accomplished.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An encoder having a housing for attaching the encoder to the front end of a motor (1) having a motor shaft (2) protruding into the housing, the housing comprising a base plate (4) including an inner part (4*a*) and an upper housing part (11), the upper housing part adapted to accommodate the inner part (4*a*) when the upper housing part (11) and base plate (4) are assembled, the inner part (4*a*) including a bayonet segment (12*a*) for engaging a corresponding recess (12*b*) formed in the upper housing part (11), the bayonet segment (12*a*) including a guiding surface (5*a*) formed so as to slidingly engage a corresponding counter surface (5*b*) formed in the recess (12*b*) upon rotation of the upper housing part (11) relative to the inner part (4*a*) to separate the upper housing part (11) from the base plate (4);

a timing disk (10) having a guiding shaft (9), the guiding shaft (9) having a borehole (3) for receiving the motor shaft (2), the upper housing part (11) including a contact surface (16) concentric with the motor shaft (2) for adjusting the timing disk (10); and a fork (14) which is moveable through slots in the upper housing part (11) in a direction transverse to the guiding shaft (9), the fork (14) having radial extensions (14*a*), (14*b*) and a clamp (18) for embracing the guiding shaft (9) between the radial extensions (14*a*), (14*b*) in semicircular fashion when the fork is in a first position before the upper housing part and base plate are assembled, and releasing the guiding shaft (9) when the fork is in a second position after the upper housing part (11) and base plate (4) are assembled, and wherein, in said first position, the fork (14) aligns the guiding shaft (9) concentrically with the motor shaft (2).

2. The encoder of claim 1, wherein the bayonet segments (12*a*) have a guiding surface (5*a*), and wherein, in the upper part (11) of the housing, the counter surface (5*b*) formed in the recess (12*b*) is inclined and longer than the guiding surface (5*a*), and wherein, during a rotational movement of the upper part (11) of the housing about the axis (6) of the timing disk, the counter surface (5*b*) is moveable on the guiding surface (5*a*) of the bayonet segments (12*a*) in the axial direction away from the base plate.

3. The encoder of claim 1, wherein the guiding shaft (9) has an outer cone (19), tapering towards the motor and on which, before assembly of the upper housing plate and base plate, an elastic ring (20) is disposed as a stop for the fork (14) in the end position B after assembly.

\* \* \* \* \*

UNITED STATES PATENT AND TRADEMARK OFFICE
CERTIFICATE OF CORRECTION

PATENT NO. : 6,462,442 B1
DATED : October 8, 2002
INVENTOR(S) : Paul-Wilhelm Braun et al.

It is certified that error appears in the above-identified patent and that said Letters Patent is hereby corrected as shown below:

<u>Title page,</u>
Item [73], Assignee, delete "PWB-Ruhlatec Industrieprodkte GmbH" and substitute
-- PWB-Ruhlatec Industrieprodukte GmbH --.

Signed and Sealed this

Twenty-seventh Day of May, 2003

JAMES E. ROGAN
*Director of the United States Patent and Trademark Office*